United States Patent [19]

McClocklin

[11] 4,049,019
[45] Sept. 20, 1977

[54] ROTARY VALVE

[75] Inventor: Samuel B. McClocklin, Owatonna, Minn.

[73] Assignee: Owatonna Tool Company, Owatonna, Minn.

[21] Appl. No.: 723,025

[22] Filed: Sept. 13, 1976

[51] Int. Cl.$^2$ .............................................. F15B 13/04
[52] U.S. Cl. ........................... 137/625.21; 137/596.12
[58] Field of Search ...................... 137/625.21, 625.22, 137/625.23, 596.12

[56] References Cited

U.S. PATENT DOCUMENTS

| 3,556,151 | 1/1971 | Masuda | 137/625.21 |
| 3,677,295 | 7/1972 | Schultz | 137/596.12 |
| 3,892,259 | 7/1975 | McClocklin | 137/625.21 |

Primary Examiner—Alan Cohan
Attorney, Agent, or Firm—Wegner, Stellman, McCord, Wiles & Wood

[57] ABSTRACT

A rotary valve having a valve body with a rotatable valve member in the form of a port plate rotatably positioned therein for causing free flow from pump to reservoir in a neutral position and having other operative positions for directing fluid to and from the valve. Passage means in the valve body have check valves providing free flow from a control port to an operative member, such as a cylinder, and for holding of pressure on the cylinder when the valve is returned to neutral position. The valve includes seat seal members positioned within flow passages in the valve body and engageable with the valve member and which are formed with opposed surfaces having a differential area whereby forces resulting from fluid pressure urge the seat seal members against the valve member.

9 Claims, 11 Drawing Figures

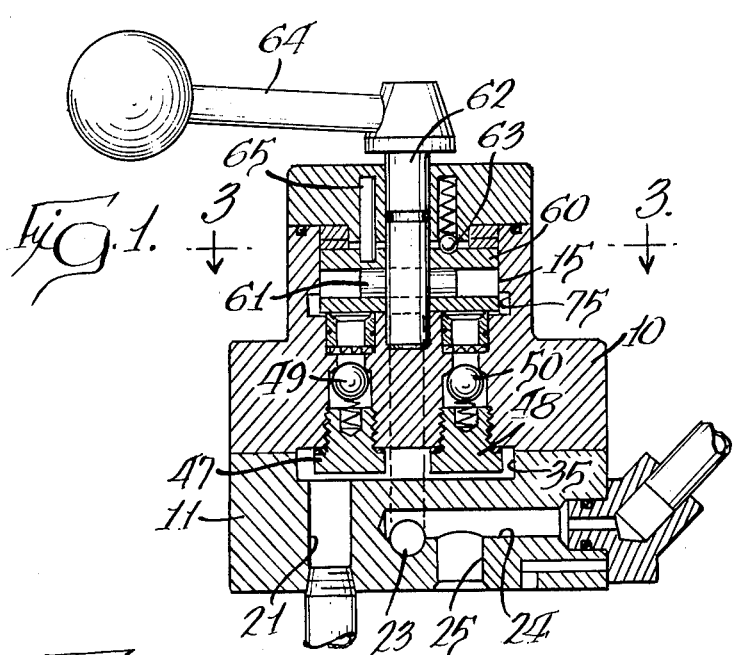
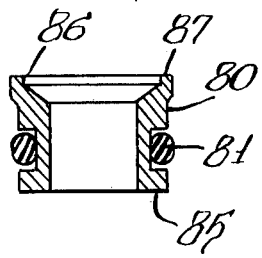
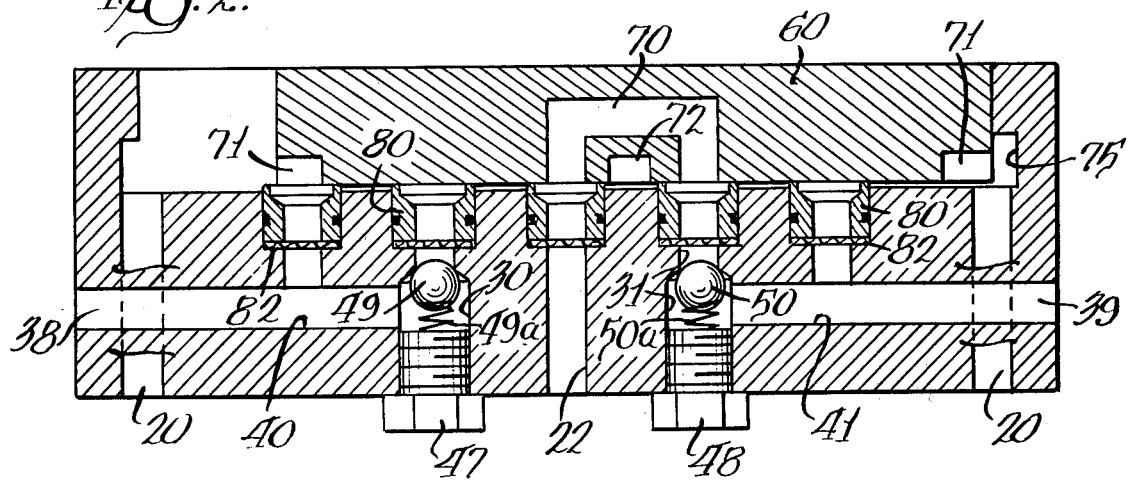

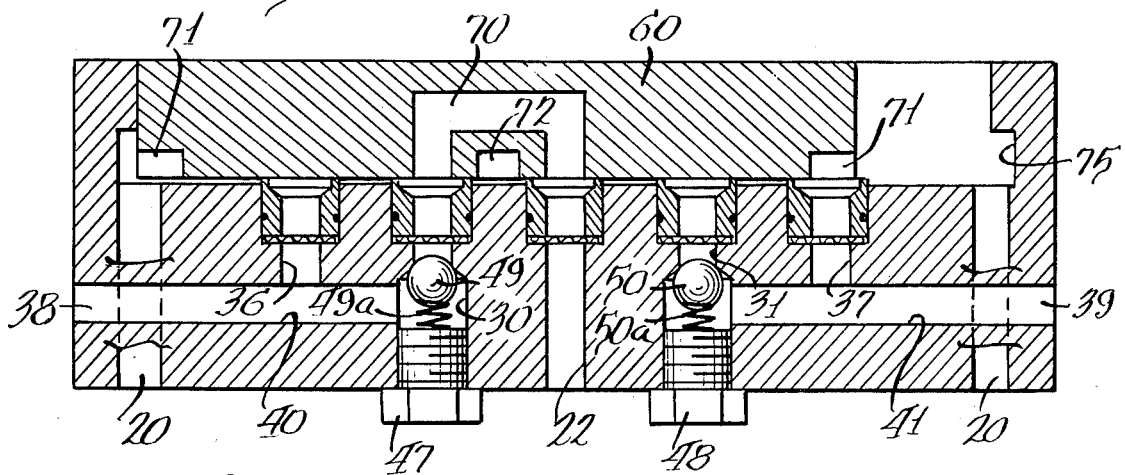
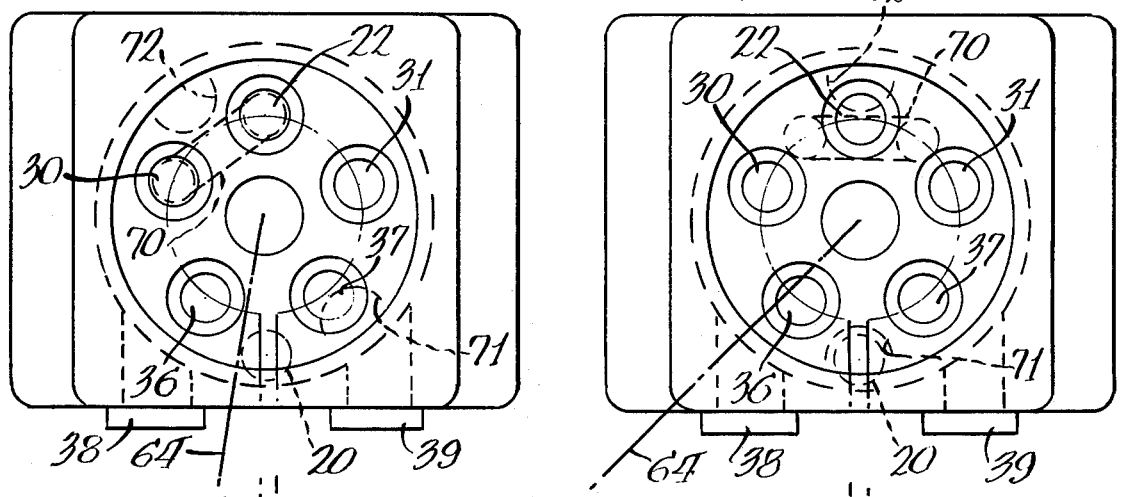
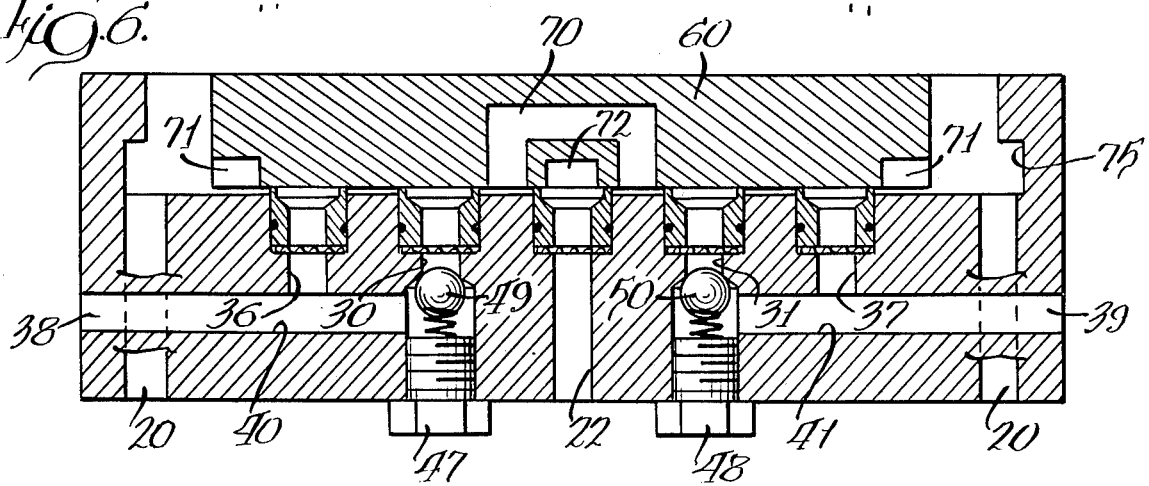

ROTARY VALVE

BACKGROUND OF THE INVENTION

This invention pertains to rotary valves operable as either a three-way valve or a four-way valve for either advance or retraction of an operative member, such as a cylinder, and with there being a neutral position with the connections to the cylinder blocked and with there being free flow from the pump through the valve to reservoir.

A prior structure of applicant is shown in McClocklin U.S. Pat. No. 3,892,259, granted July 1, 1975, which shows a rotary control valve operable as either a three-way valve or a four-way valve.

Other valves of this general type are shown in Masuda U.S. Pat. No. 3,556,151 and Schultz U.S. Pat. No. 3,677,295. The first of these patents discloses valve structures wherein an added plate is provided to reduce leakage problems. The second of these patents has a construction wherein the rotatabe valve member has a pair of passages, each having a check valve; however, the check valves are not located in a position to prevent leakage of pressure when the valve member is shifted back to neutral and the structure of the patent includes specialized seat seal members which are necessary in addition to the check valves in order to assure the holding of pressure during movement of the valve member. Additionally, the seat seal members require a high overbalance of force to maintain the members against the valve plate.

SUMMARY OF THE INVENTION

A primary feature of the invention relates to a rotary valve having a neutral hold position permitting free flow from pump to reservoir as well as at least one position for directing pressure fluid to control port and an operated device, and a third position to permit return flow from the control port to tank with check valve means associated with the passages of the valve body whereby the check valve means positively operates to prevent loss of pressure and the return passage remains closed as the valve is shifted from said operative position back to the neutral hold position.

An object of the invention is to provide a rotary valve operable as either a three-way or a four-way valve, wherein the valve body has passages associated with ports to connect the valve to a supply of pressure fluid and to tank and also to connect the valve to at least one end of an operating device. The valve member has means to provide for flow from pump to tank in a neutral hold position and, in another position, to direct pressure fluid to a control port for delivery to the operated member and with a check valve positioned in the valve body passage communicating with the control port to permit free flow of fluid out of the control port while preventing return flow as the valve member is returned to the neutral hold position.

A further object of the invention is to provide a rotary valve as defined in the preceding paragraph wherein there are two control ports for connection to opposite ends of a cylinder, with there being a pair of connecting passages associated with each control port and one of the connecting passages having a check valve preventing return flow from the cylinder whereby delivery of fluid pressure to the cylinder is through an open check valve and return of fluid from the cylinder through the control port is through the other passage associated with the control port which remains closed when shifted to neutral and opens when shifted to the opposite position, bypassing the check valve.

An additional object of the invention is to provide seat seal members in the valve body passages for engagement with the valve member and with the seat valve members having opposed surfaces of slightly differing area whereby the differential area subjected to fluid pressure results in relatively small force urging the seat seal member toward the valve member.

BRIEF DESCRIPTION OF THE DRAWING

FIG. 1 is a generally central vertical section of the rotary valve and taken generally along the line 1—1 shown in FIG. 3;

FIG. 2 is a fragmentary vertical view of the rotary valve as a 4-way valve and taken generally along the line 2—2 in FIG. 3 and developed along the centers of the valve body passages with the rotary valve projected into a plane and positioned to direct pressure fluid to one of the control ports;

FIG. 3 is a plan section, taken generally along the line 3—3 in FIG. 1, with the parts positioned as shown in FIG. 2 and with the rotatable valve member omitted but the flow passages in the valve member shown in phantom;

FIG. 4 is a view, similar to FIG. 2, and taken generally along the line 4—4 in FIG. 5, with the rotary valve positioned to deliver pressure fluid to the other control port;

FIG. 5 is a view, similar to FIG. 3, showing the valve member passages in phantom as positioned in FIG. 4;

FIG. 6 is a view, similar to FIG. 4, and taken generally along the line 6—6 in FIG. 7, showing the rotary valve positioned in a neutral hold position;

FIG. 7 is a view, similar to FIG. 3, showing the valve member passages as positioned in FIG. 6;

FIG. 8 is a central vertical section on an enlarged scale of a seat seal member;

DESCRIPTION OF THE PREFERRED EMBODIMENT

Figure 9:
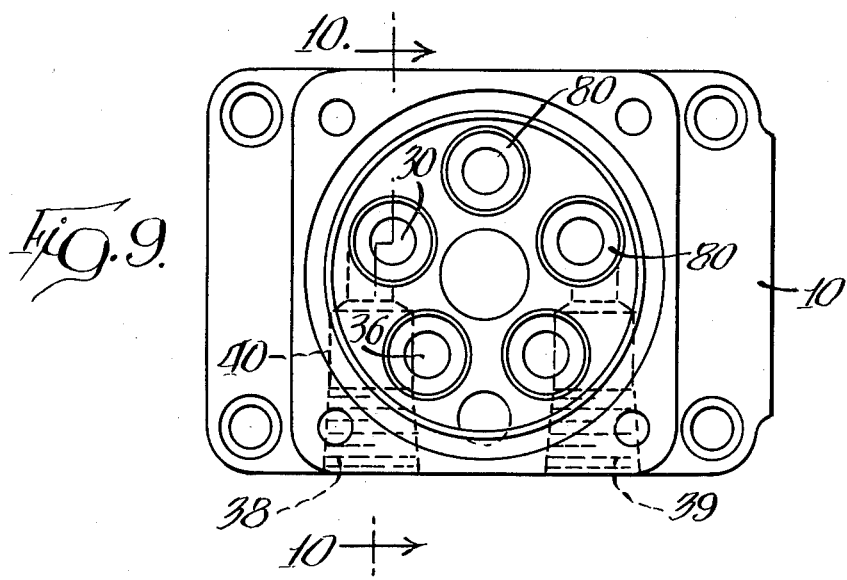
FIG. 9 is a plan section, taken generally along the line 3—3 in FIG. 1.
Figure 10:
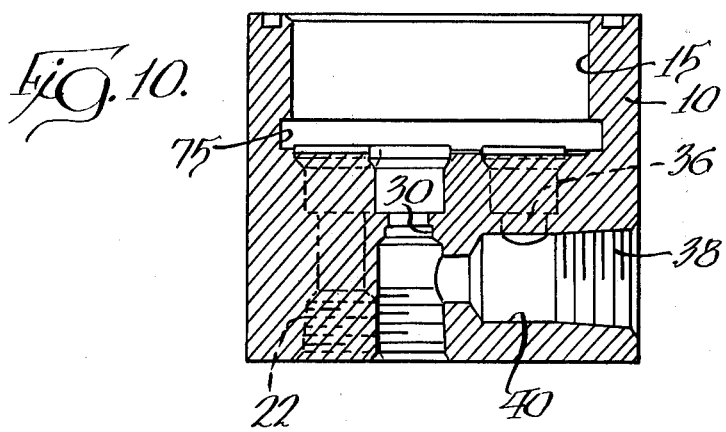
FIG. 10 is a vertical section, taken along the line 10 in FIG. 9 with a check valve structure omitted in an auxiliary passage.

The rotary valve has a valve body formed of assembled parts with a central part 10 closed off by a lower part 11 and an upper part 12. The central part 10 has a chamber 15 with which a series of passages communicate. These passages include a passage 20 connecting with a passage 21 in the lower part 11 of the body connectable to tank and a passage 22 having an extension into the lower part 11 which, through connecting passages 23, 24 and 25, is connectable to a source of fluid under pressure. The passage 22 is one of five passages in the valve body which open into the chamber 15 and which all lie on a circle having an axis of rotation of a valve member as its center.

Positioned immediately to either side of the passage 22, a pair of passages 30 and 31 constitute auxiliary passages and extend through to a secondary chamber 35 formed by a cavity in the lower body part 11 and which is closed off by the central body part 10. A pair of control port 38 and 39 are connected, one to each of the remaining two passages, namely control passage 36 and 37. The control ports 38 and 39 connect with the control passages by laterally-extending, intersecting passages 40 and 41. The passages 40 and 41 extend to a location to connect with auxiliary passages 30 and 31, whereby there can be flow communication between a control passage and an auxiliary passage.

Means are positioned in each of the auxiliary passages 30 and 31 to block said passages from communication with the secondary chamber 35, with this means including threaded plugs 47 and 48 in the respective auxiliary passages. These plugs have check valve means associated therewith, with a ball check 49 coacting with a seat in the auxiliary passage 30 to block flow toward the chamber 15, but permitting fluid to flow from a port plate 60 through the connecting passage 40 to the control passage 36. The ball check 50 is positioned in the auxiliary passage 31 and acts to block flow toward the chamber 15, but permits fluid to flow from the port plate 60 through the connecting passage 41 to the control passage 37.

A valve member in the form of a port plate 60 is positioned within the chamber 15 and secured, by means of a pin 61, to an operating shaft 62 for rotation about an axis as defined by the rotatable mounting of the operating shaft 62 in the central body part 10 and the upper body part 12. The valve member 60 can be held in an operated position by a spring-urged detent 63, with the valve member being positioned by an operating handle 64 and the rotational movement of the valve member being limited by a pin 65 carried in the upper body part 12 and coacting with an arcuate groove (not shown) formed in the upper side of the valve member 60.

The valve member has a flow passage 70 formed internally therein which has opposite ends opening downwardly towards the ends of the passages formed in the valve body 10 and which, in a neutral hold position of the valve, is in an inactive position, as shown in FIGS. 6 and 7. Rotation of the valve member 60 can resultingly position the flow passage in either of the positions shown in FIGS. 3 and 5 wherein one end of the flow passage overlies the pressure passage 22 and the other end overlies one or the other of the auxiliary passages 30 and 31. Additionally, the valve member 60 has a pair of notch passages 71 and 72 at its periphery which selectively operate to provide a connection to the tank passage 20 by being placed in overlying relation with a flow passage in the valve body part 10 and opening to an annular groove 75 formed at the base of the chamber 15 and which communicates with the tank passage 20.

The upper ends of the five valve body passages which are exposed to pressure fluid are each provided with a seat seal member 80, as shown particularly in FIG. 8, which is seated in an enlarged diameter portion of each of the passages, with an outer sealing O-ring 81 and an underlying spring which urges the seat seal member upwardly against the underside of the valve member. Additionally, the seat seal members are semi-balanced in that opposed surfaces have a differential area whereby a resultant force resulting from fluid pressure urges the seat seal members toward the valve member 60 with a small force to maintain a seal but still holding the frictional force to a minimum whereby the valve member may be rotated by the handle 64 with reasonable force. The opposed surfaces include the lower end 85 of the seat seal member 80 having a diameter which is a small amount greater than the diameter of the inner edge 86 of the opposite face 87 of the seat seal member.

In operation of the valve, the neutral hold position is as shown in FIGS. 6 and 7 wherein the flow passage 70 of the valve member 60 is out of communication with all active passages of the valve. In this position, the notch passage 72 partially overlies the upper end of the pressure passage 22 and thus communicates the pump with the tank passage 20 through the annular groove 75.

Assuming an operating member, such as a double-acting cylinder is connected to the rotary valve for operation thereof, the cylinder may be extended in one direction by delivery of pressure fluid to the control port 38 (FIGS. 4 and 5). The flow passage 70 is positioned to overlie the pressure passage 22 and the auxiliary passage 30 whereby the check ball 49 is shifted against the action of an associated spring 49a to connect the auxiliary passage 30 with the control passsage 36 through the connecting passage 40. In this position, the other control port 39 is connected to tank by having the control passage 37 in communication with the notch passage 71 which is in overlying relation therewith and which extends to the annular groove 75.

For extension of the operated cylinder in the opposite direction, the rotary valve is moved to the position shown in FIGS. 2 and 3 wherein the flow passage 70 connects the pressure passage 22 with the auxiliary passage 31. This opens check ball 50 against the action of an associated spring 50a to permit flow to the control passage 37 through the connecting passage 41. Flow returning from the cylinder to the control port 38 may flow freely to tank through the notch passage 71 which communicates with the control passage 36.

In movement of the rotary valve from either of the operated positions of FIGS. 3 and 5 to the neutral hold position of FIG. 7, it will be noted that pressure applied to the cylinder is held, since the particular check valve which has previously been opened will automatically move to seated position and control passage 36 and 37 remains closed during the shift from operating position to neutral.

The structure as disclosed in FIGS. 1 to 10 embodies a 4-way valve which allows free flow from pump to reservoir in a neutral hold position, with the cylinder ports blocked and with there being retention of pressure on a cylinder control port without any loss therein when the valve is shifted back to the neutral hold position.

Figure 11:
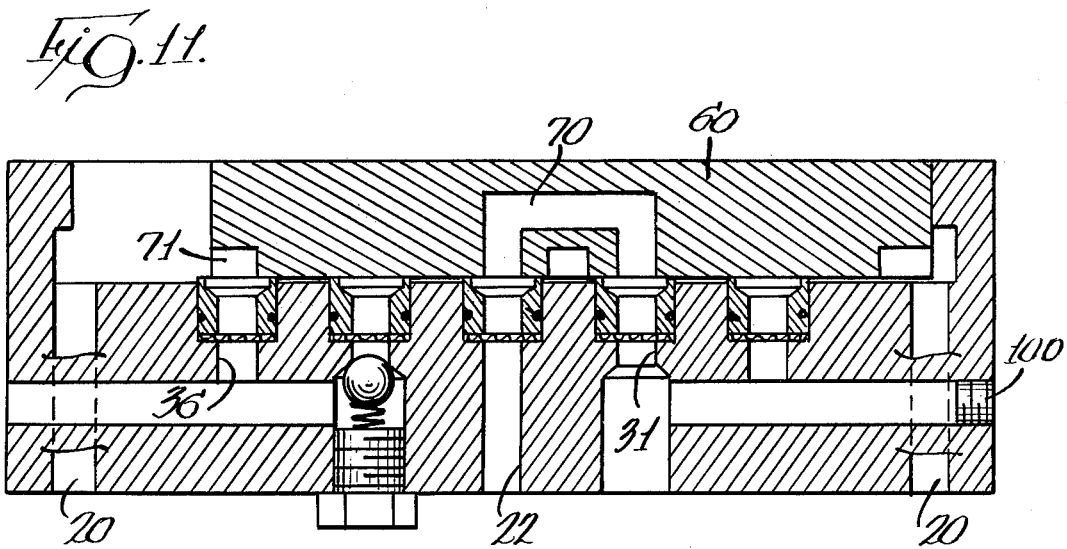
FIG. 11 is a view, similar to FIG. 2, illustrating the 3-way valve structure with check valve structure omitted.

It is possible to use the same rotary valve as a 3-way valve which allows free flow from pump to reservoir in neutral, with the cylinder port blocked and fluid can be directed to the cylinder when the rotary valve is shifted to an advance position with there being free flow from the cylinder to reservoir when the rotary valve is shifted to a return position. The adaptation for this purpose, as shown in FIG. 11, includes removal of the threaded plug 48 and associated check valve structure including the ball check 50 whereby the auxiliary passage 31 may connect with the secondary chamber 35 which communicates with tank. A plug 100 is inserted in the control passage 37. The neutral hold position for the 3-way valve is the position of the 4-way valve as shown in FIGS. 6 and 7. With the control port 38 connected to cylinder, the advance position of the 3-way valve would be with the parts positioned as shown in FIGS. 4 and 5 wherein fluid pressure is directed to the auxiliary passage 30 for flow to the control passage 36 and the control port 38. Upon return of the rotary valve to the neutral hold position, the control passage 36 has its upper end blocked by the valve member 60 and this action, together with the check valve 49 prevents reduction in pressure applied to the cylinder.

The return position of the three-way rotary valve is as illustrated in FIGS. 2 and 3 wherein the flow passage 70 connects the pressure passage 22 with the auxiliary passage 31, with the latter passage connecting to the secondary chamber 35 because of removal of the plug 48 and the check valve 50 whereby the pump is connected to tank. Fluid returns from the cylinder through control port 38 to the control passage 36 which, in this position of the rotary valve member 60, has the notch passage 71 in overlying relation therewith whereby there is flow to tank through the annular groove 75.

I claim:

1. A valve having a body with a chamber, a pressure port, and a control port for controlling the flow of fluid to and from a fluid-operated member, passage means in said body between said control port and said chamber with said passage means having two communicating branch passages connecting to said chamber, a check valve positioned in one branch passage to block flow toward said chamber, and a valve member movable in said chamber and having means operable in a first neutral hold position to connect said pressure port to tank, operable in a second position to connect said pressure port to said branch passage having the check valve for flow to the control port, and operable in a third position to connect the other of said branch passages to tank with movement of the valve member from the second position back to the first position not permitting flow from said control port to said chamber because of said check valve.

2. A valve as defined in claim 1 including an additional control port, additional passage means between said additional control port and said chamber with communicating branch passages and a check valve similarly positioned in one branch passage, and said valve member in said second and third positions controlling flow to and from said additional control port.

3. A valve as defined in claim 1 including a seat seal member positioned in each of said passage means for contact with said valve member and semi-balancing means associated with said seat seal members and responsive to fluid pressure to hold a seat seal in sealing relation with the valve member.

4. A valve as defined in claim 3 wherein said semi-balancing means includes differential areas of said seat seal member in opposed relation which are subject to fluid pressure with the area difference resulting in a pressure created force urging the seat seal member toward the valve member.

5. A valve as defined in claim 1 wherein said chamber is cylindrical and has a connection to a tank port and said valve member is cylindrical and peripherally spaced from the wall of said chamber, and means defining a notch in said valve member opening to the periphery of the valve member and which communicates with the pressure port in said first neutral position but which is out of flow communication with all ports in said second and third positions.

6. A valve for allowing free flow from pump to tank in a neutral hold position and for flow to or from a pair of control ports in other operating modes including a chamber with a pressure passage, a tank passage and two passage means each connected to a control port, each of said passage means having first and second communicating branch passages opening to said chamber with the first branch passage having a check valve preventing flow toward said chamber, a seat seal member positioned in each of said passages and passage means to engage a valve member, and a movable valve member engageable with said seat seal members and having means to direct flow to a control port through one of the first branch passages having a check valve and having means to connect the other control port to tank by flow through a second branch passage of the other passage means.

7. A manually operable valve for allowing free flow from pump to tank in a neutral hold position and for flow to or from two control ports in other operating modes including a valve body with a cylindrical chamber, a cylindrical valve member positioned in said chamber and spaced peripherally from the wall of the chamber and rotatable about an axis, five passages in said valve body opening to said chamber and all lying on a circle having said axis at its center, a seat seal member positioned in each of said passages for engagement with said valve member, a secondary chamber in said body with two of said passages being auxiliary passages and extending to said secondary chamber, a tank port communicating with said secondary chamber and also said chamber beyond the periphery of said valve member, a pressure port communicating with a third of said five passages positioned between said auxiliary passages, a pair of control ports connected one to each of the remaining two passages which are control passages, a pair of connecting passages for connecting said control passages one to each of said auxiliary passages, means including a check valve in each of said auxiliary passages for blocking communication thereof with said secondary chamber and for blocking flow from said control passages to said chamber, and said valve member having a flow passage and a pair of peripheral notch passages whereby in a first neutral hold position said flow passage is blocked and one of said peripheral notch passages overlies said third passage, in a second advance position said valve member flow passage connects said third passage and one of said auxiliary passages to cause pressure flow through a check valve and a connecting passage to a control passage with the other of said notch passages overlying the other control passage to connect the latter to the tank port, and in a third return position said valve member flow passage connects said third passage and the other of said auxiliary passages to cause pressure flow through a check valve and a connecting passage to the other control passage and with said other of said notch passages overlying a control passage for connection thereof to the tank port.

8. A valve as defined in claim 7 wherein each of said seat seal members has opposite ends subjected to fluid pressure and with said ends having a differential area whereby fluid pressure urges a seat seal member toward the valve member.

9. A manually operable valve for allowing free flow from pump to tank in a neutral hold position and for flow to or from a control port in other operating modes including a valve body with a cylindrical chamber, a cylindrical valve member positioned in said chamber and spaced peripherally from the wall of the chamber and rotatable about an axis, five passages in said valve body opening to said chamber and all lying on a circle having said axis at its center, a secondary chamber in said body with two of said passages being auxiliary passages and extending to said secondary chamber, a tank port communicating with said secondary chamber and also said chamber beyond the periphery of said valve member, a pressure port communicating with a third of said five passages, a control port connected to one of the remaining two passages which is a control passage, a pair of connecting passages for connecting said control passages one to each of said auxiliary passages, means including a check valve in one of said auxiliary passages for blocking communication thereof with said secondary chamber and for blocking flow from said control passage to said chamber, and said valve member having a flow passage and a pair of peripheral notch passages whereby in a first neutral hold position said flow passage is blocked and one of said peripheral notch passages overlies said third passage, in a second advance position said valve member flow passage connects said third passage and said one of said auxiliary passages to cause pressure flow through the check valve and a connecting passage to the control passage, and in a third return position said valve member flow passage connects said third passage and the other of said auxiliary passages to cause pressure fluid flow to the secondary chamber and tank and with the other of said notch passages overlying said control passage for connection thereof to the tank port.

* * * * *